Patented Mar. 12, 1929.

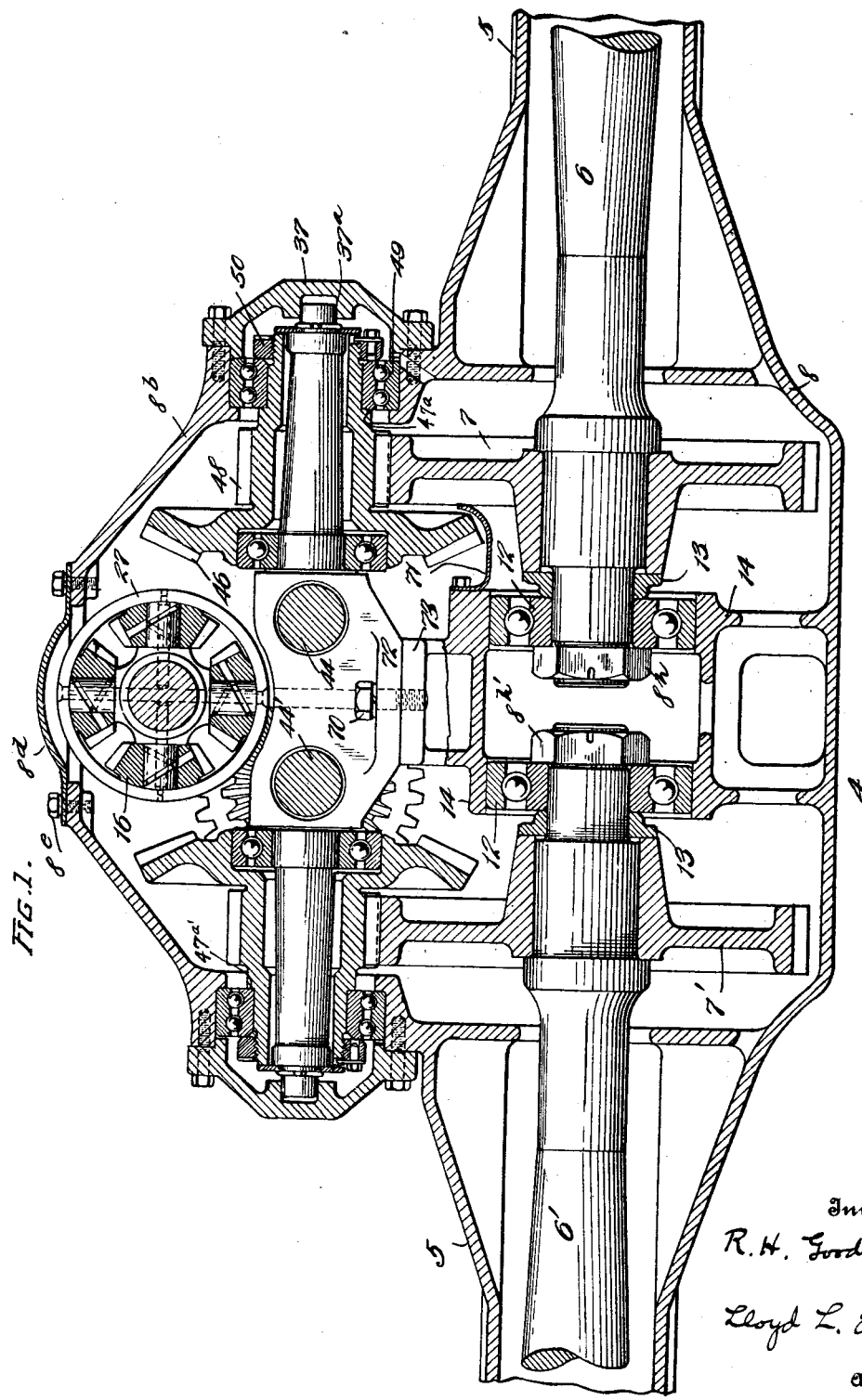

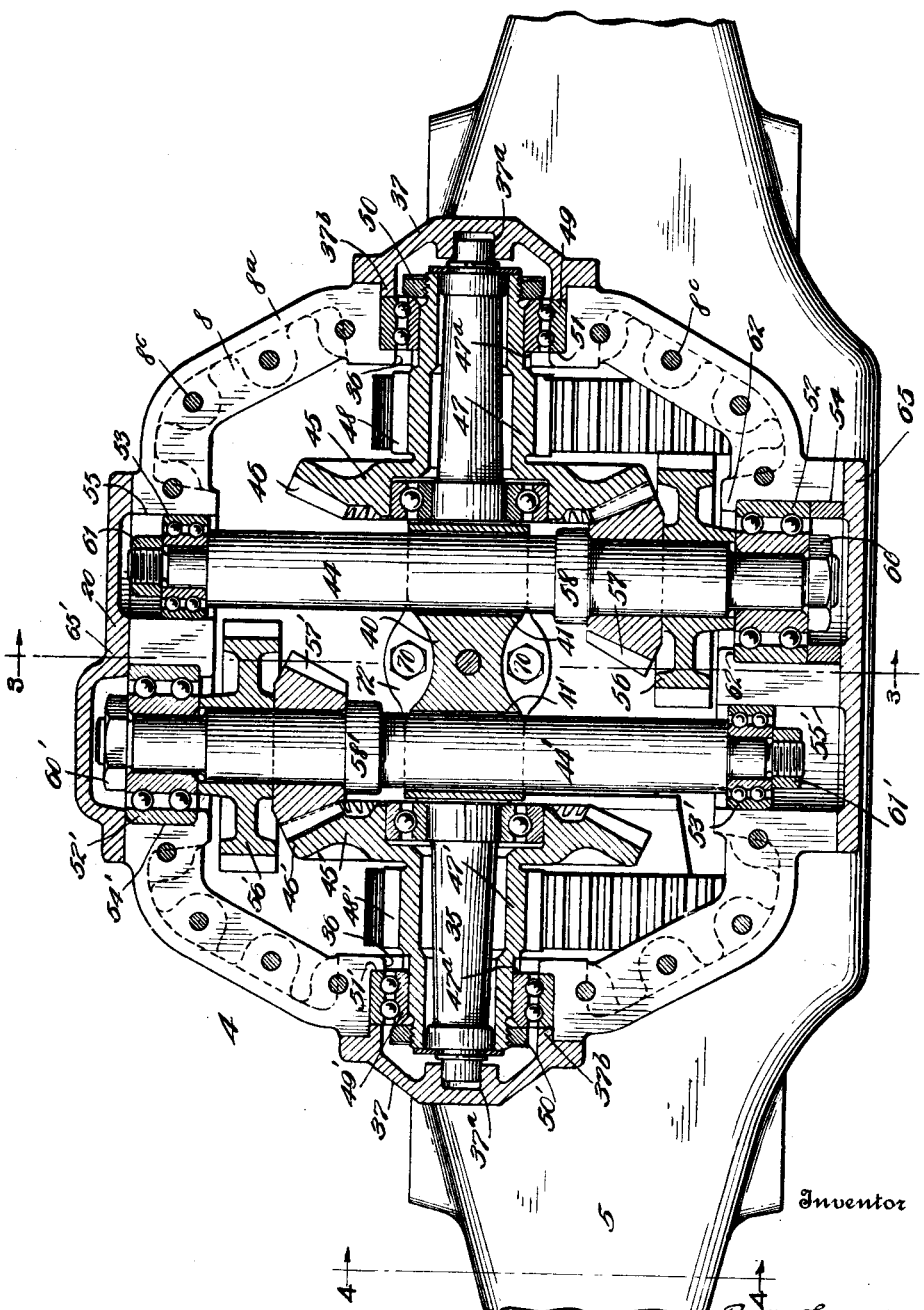

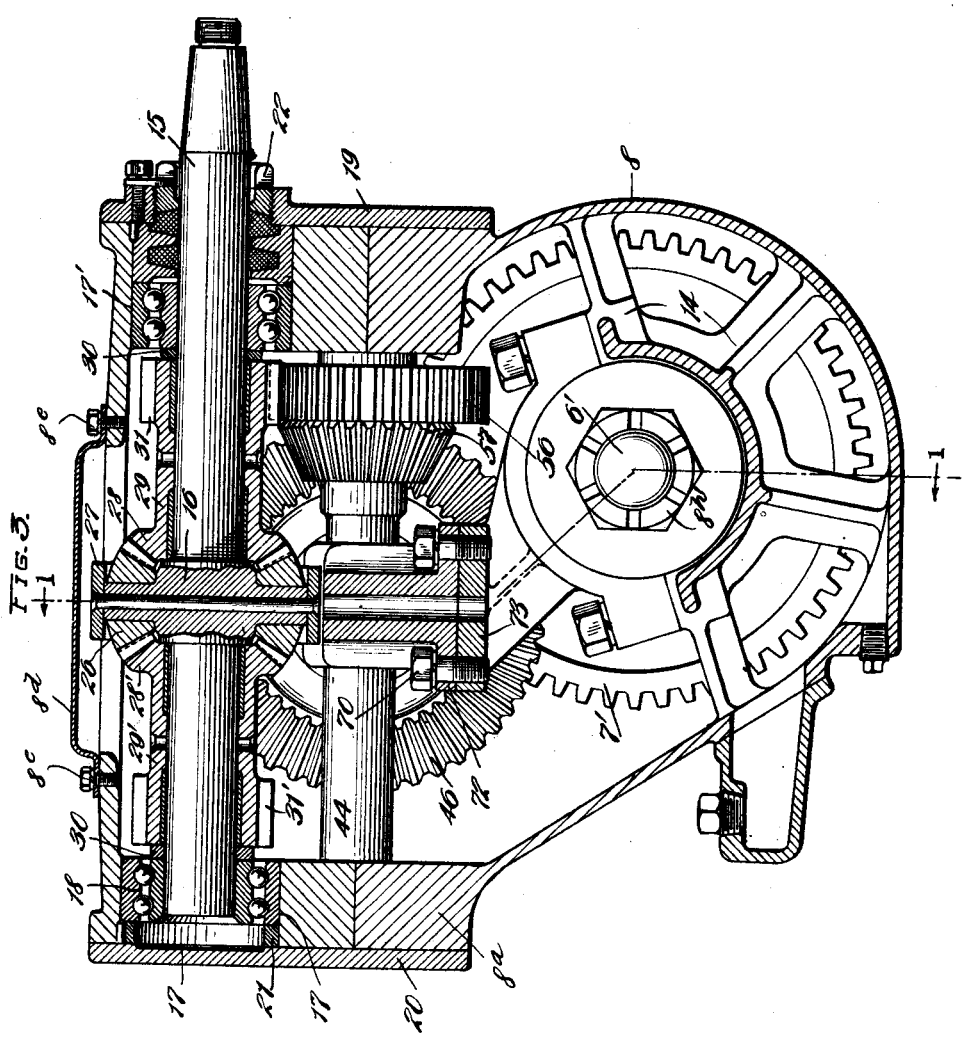

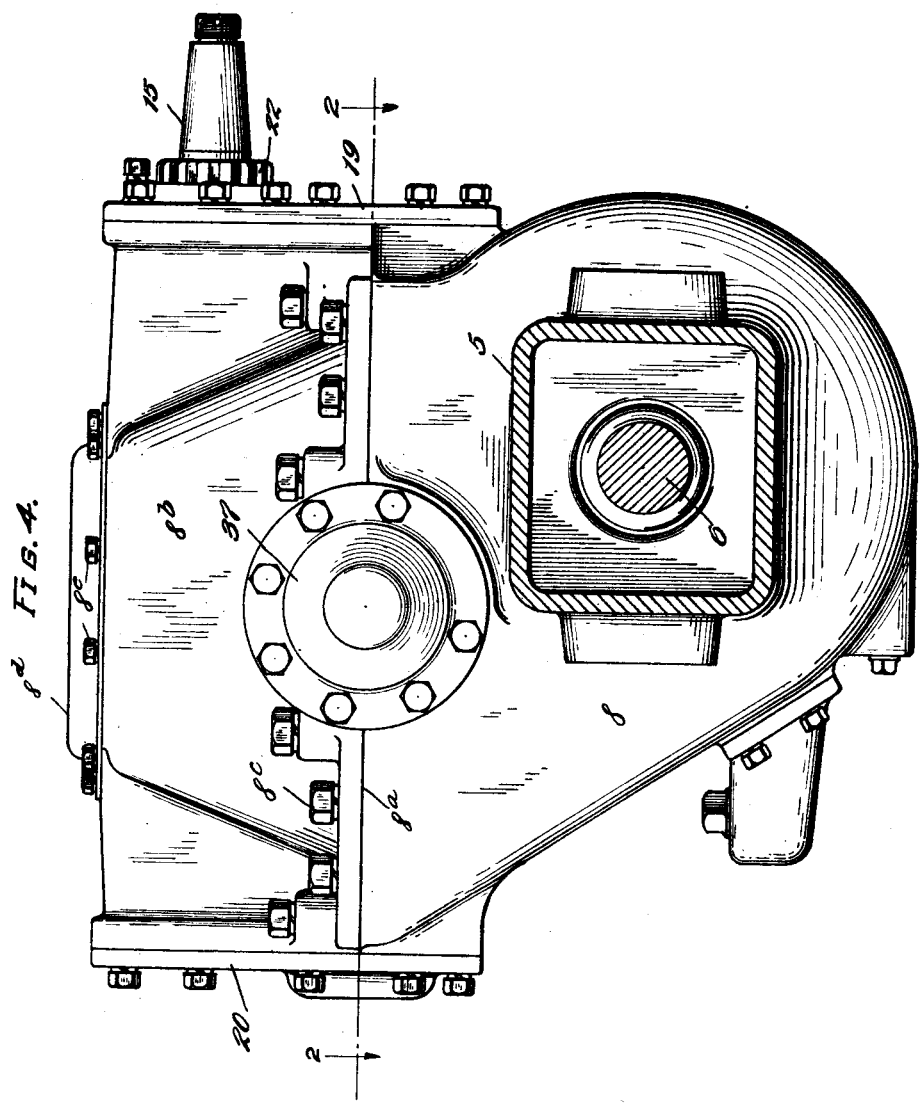

1,705,111

UNITED STATES PATENT OFFICE.

RALPH H. GOODRICH, OF OWEGO, NEW YORK, ASSIGNOR, BY MESNE ASSIGNMENTS, TO THE UNION TRUST COMPANY, A CORPORATION OF OHIO.

POWER-TRANSMITTING MECHANISM.

Application filed October 10, 1922. Serial No. 593,504.

This invention relates to motor vehicles, more particularly to the power transmitting mechanism therefor.

One object of the invention is to provide an improved power transmitting mechanism capable of transmitting the power of the engine to the drive wheel or wheels of the vehicle effectively and economically.

Another object of the invention is to provide a power transmitting mechanism in which the proper speed reduction may be secured between the propeller shaft and the traction wheel or wheels to propel the vehicle positively and with minimum friction losses.

Another object of the invention is to simplify, in construction and arrangement the elements constituting the power transmitting mechanism.

Another object of the invention is to provide mechanism of this character in which the differential elements and proper speed reducing elements are correlated and combined to transmit the power of the propeller shaft in a relatively efficient manner.

Another object of the invention is to so construct and correlate the elements constituting the differential and speed reducing elements and the housing members therefor that adjustments, assembly and disassembly of such elements and members may be readily made.

Another object of the invention is to provide novel means for supporting the elements of the power transmitting mechanism, whereby all twisting, flexing and distortion of the driven axles are prevented and the gear elements are at all times maintained in proper cooperative relationship with each other.

Another object of the invention is to provide a power transmitting construction in which the differential is on the propeller shaft and there are three stages of speed reduction between the differential and the axle sections.

Another object of the invention is to provide such a power transmitting construction in which the differential mechanism may be located substantially in or forwardly of, or rearwardly of the vertical plane through the axis of the axle sections.

Other objects of the invention will be apparent to those skilled in the art to which my invention relates from the following description, and the accompanying drawings.

For the purpose of illustration I have in the accompanying drawings shown and herein described one form of apparatus embodying my invention.

Figure 1 is a fragmental view partly in section showing the power transmitting mechanism taken on the line 1—1, Fig. 3.

Fig. 2 is a section on line 2—2, Fig. 4.

Fig. 3 is a section on line 3—3, Fig. 2.

Fig. 4 is a side elevation partly in section of the axle housing.

In the drawings, 4 indicates as an entirety that axle, preferably the rear axle, of a vehicle which may be propelled by a propeller shaft by suitable motive power, for example an internal combustion motor (not shown). The elements for transmitting power from the propeller shaft to the rear axle are preferably constructed and correlated to permit the axis of the driving element connected to the rear end of the propeller shaft to be arranged when the chassis is disposed in normal position relative to the axes of the vehicle axles substantially in axial alinement with the motor of the crank shaft, whereby the latter said element and the intermediate element or elements constituting the propeller shaft may transmit the power of the motor with minimum friction losses. The rear axle 4 preferably includes a housing 8 and a pair of tubular members 5. The tubular members 5 enclose driven axle sections 6, 6' which may be connected in any suitable manner to the rear wheels (not shown).

At their inner ends the tubular members 5 are flared or enlarged to form a bottom and parts of the sides and ends of the housing member 8. The upper part of the lower portion of the housing 8 is provided with flanges 8$^a$ to receive cooperating flanges of the upper part of the housing 8$^b$, said flanges being secured together by means of bolts 8$^c$. The upper housing section may be provided at its top with an opening covered by a removable cap 8$^d$, secured thereto by means of bolts 8$^e$ threaded into apertures in the flanges of the housing section 8$^b$.

Secured to the driven axle sections 6, 6' in any desired manner, as by keying, are spur gears 7, 7'. Preferably the axle sections are reduced at their inner ends to form shoulders against which the hubs of the spur gears 7, 7' are clamped by nuts 8$^h$, 8$^h$ respectively, the latter engaging the threaded free ends of the axle sections 6, 6' and acting through the inner race of the bearings 12 and spacing sleeves 13 mounted upon the axle sections.

The bearings 12 are suitably mounted in a bearing support 14 which is carried by the housing 8, or if desired integral therewith, and which is provided with arms or braces connecting it to the bottom and sides of the housing. The inner races of these bearings receive the inner ends of the axle sections, 6, 6'.

Of the power transmitting and speed reducing mechanism, 15 indicates a shaft section which constitutes that element of differential mechanism 16 which is connected to and driven by the vehicle propeller shaft (not shown). At its forward end the shaft 15 is adapted to be connected in any well known manner, but preferably by a universal joint, to the rear end of a propeller shaft to be driven thereby. The rear end of the shaft section 15 extends through the opening 17 formed therefor in the housing section 8$^b$. The bearings 18 are mounted in the opening 17 and the corresponding opening 17' at the opposite side of the housing in which the shaft section 15 is carried.

Detachably secured to the front and rear of the axle housing section 8$^b$ are cover members 19 and 20 respectively. The rear cover member is imperforate and encloses the rear of the shaft section 15 and the opening 17 formed in the housing section. The spacing sleeve 21 lies between the bearing 18 and the closure member 20 and the adjustable closure nut 22 surrounds the shaft 15 and is threaded into the closure member 19. The nut 22 and housing section are both recessed and receive suitable packing, so that when the nut is tightened leakage of lubricant from the axle housing is prevented. Secured to the shaft 15 or preferably integral therewith are a plurality of studs extending radially and carrying bevel pinions 26 loosely mounted thereon but held in position by heads which may comprise an annular ring 27. 28, 28' indicate differential bevel gears having hubs 29, 29' respectively, loosely mounted on the shaft section 15, and the gears 28, 28' mesh with the differential bevel pinions 26 and are rotated thereby together, or relatively to each other in the usual manner. The hubs 29, 29' are preferably of such length that their outer ends may serve as abutments for the inner races of the bearings 18, suitable thrust collars 30 being interposed if desired. At their outer ends the hubs 29, 29' are provided with pinions 31, 31' preferably of the spur type, the purpose of which will be later described.

35 indicates a supporting or truss member preferably extending across the housing, the outer or free ends of which extend thru openings 36 located in the housing section 8$^b$. The closure members 37 are detachably secured to the housing member 8$^b$ to close the openings 36 and they are formed with sockets 37$^a$ to receive the end of the truss member 35, the sockets being sufficiently deep so that when the closure members 37 are tightly secured in place, the bottoms of the sockets 37$^a$ will not engage the ends of the truss member. The central body portion 40 of the truss member 35 is preferably formed with openings 41 and 41' to receive driven shafts 44, 44' rotatably mounted therein, the purpose of which shafts being hereinafter described. Intermediate the central portion 40 and the closures 37 the member 35 serves as an axle or fixed shaft on which are mounted similar gear elements 45, 45'. The gear elements preferably comprise bevel gears 46, 46', having hubs 47, 47'. Loosely fitting the axle and mounted thereon, and preferably integral with the hubs 47, 47', are spur pinions 48, 48', the purpose of which is hereinafter described. The hubs 47, 47' have reduced outer ends whereby shouldered portions 47$^a$, 47$^{a'}$ are formed. The inner races of suitable radial and thrust bearings 49, 49' are mounted on the reduced hub portions and held tightly against the shoulders 47$^a$, 47$^{a'}$ by means of the nuts 50, 50' threaded on the outer ends of said hub members. The outer races of the bearings 49, 49' engage the shoulders 51, 51' formed in the openings 36.

The closure members 37 are formed with annular flanges 37$^b$, which bear against the outer races of the bearings 49, 49'. When the closure members are securely tightened in place, they hold the bearings 49 tightly against the shoulders 47$^a$ and thus locate the bevel gears and hubs correctly, so that the bevel gears and bevel pinions have proper engagement.

The shafts 44, 44' are carried by bearings 52, 53 and 52', 53' respectively mounted in openings 54, 55, and 54', 55' in the opposite walls of the housing 8, part of such openings coming in the lower section of the housing 8 and part in the section 8$^b$. These shafts extend through openings 41, 41' in the truss member 35 and may have bushing sleeves surrounding them in the openings if desired. But, if preferred these may be left clear so that under no conditions of stress will there be any tendency for the truss member to bear against either of them sufficiently to create wear or cause deflection.

The shaft 44 carries spur gear 56 and bevel pinion 57 suitably keyed or otherwise secured thereto in any other known way to turn therewith. The shaft is shouldered at 58 to engage the bevel pinion 57 and prevent its longitudinal movement along the shaft. The shaft 44 is reduced at each end to form shoulders against which the bearings 52, 53 are securely held by nuts 60, 61 threaded on to the outer ends of the shaft. The nut 60 presses the bearing 52 tightly against the spur gear 56 which in turn engages the bevel pinion 57 and holds it tightly against the shoulder 58. The nut 61 clamps the bearing 53 against the shoulder at the other end of the shaft and this bearing is mounted to float in the opening 55 in the housing wall. The shaft 44 is located by the closure member 65 which engages the outer race of the bearing 52 and clamps it tightly against the inner annular flange 62 surrounding the opening 54 in the housing, when the closure member is tightly secured in place. The closure member 65 also encloses the end of the shaft 44', so that a tight joint is made with the housing and as the closure is imperforate there can be no leakage of the lubricant.

The closure member 65' similarly engages the outer race of the bearing 52' of the shaft 44' and also closes the opening for the end of the shaft 44.

The shaft 44' is identical with the shaft 44 in carrying the bevel pinion, spur gear and bearings except that the shaft 44' is oppositely disposed with respect to the shaft 44, so that the gears on the one shaft come opposite the portion of the other shafts carrying no gears, thus permitting the shafts to be closely positioned and yet giving a clearance to the gears and pinions.

The central portion of the supporting or truss member 35 is preferably flanged outwardly at 72 on both sides and apertures are formed in the flanges to receive bolts 70 to secure this member rigidly to the bearing support 14. The latter is built up at 73 to receive said flanges and contains threaded sockets for the bolts. This also insures that the truss member cannot turn about its axis and thus cause a binding or frictional engagement with or even a deflection of the rotatable shafts 44, 44'. Suitable drip pans 71 may be secured if desired to the bearing support 14 to underlie the bevel gears 46, 46' and hold lubricant to be engaged by these gears.

The bevel pinions 57, 57' engage the bevel gears 46, 46' previously described. This construction of shaft members permits the power transmitting elements between one axle section 6 and the shaft 15 to be of the same construction and size as corresponding elements between the other axle section 6 and said shaft 15 and at the same time permits each gear and pinion to operate without danger of contact with other gears and pinions.

The assembly of the various parts of my power transmitting mechanism may be accomplished in the following manner. The bearings 12 and spur gears 7, 7' are secured on the inner ends of the driven axle sections 6, 6' by the nuts $8^h$, $8^{h'}$, the inner ends of the axle sections having been previously inserted through the openings in the support 14. The supporting member 35 with the rotatable shafts 44, 44' therethrough, together with all the gears and bearings therefor, may be assembled outside of the housing and put into place with the flanges 72 resting upon the portion 73 of the support 14 and the bearings 52, 53, 52', 53' engaging the openings in the housing 8. The flanges 73 can then be bolted to the support 14 thus rigidly holding the member 41. The imperforate closure members 65, 65' are then secured to the housing 8 and receive the outer ends of the supporting member 35 in the sockets $37^a$. These closures also locate the bevel gears 46, 46' with their hubs 47, 47' by engaging the bearings clamped to the hubs. Likewise the closure members 37 are secured to the housing 8 to enclose the ends of the shafts 44, 44' and position them. The driving shaft 15, together with the differential and bearings therefor, may be mounted in the upper section $8^b$ of the housing and the latter bolted to the lower part of the housing by means of the bolts $8^c$ as previously described.

Power is transmitted from the driving shaft section 15 thru the differential mechanism 16 and differential bevel gears 28, 28' respectively to rotate them on the driving shaft. As each bevel gear and hub drives a corresponding train of reduction gearing, only one train will be mentioned in tracing the power to a driven axle section 6. The spur pinion 31 being secured to, or preferably integral with, the hub of the differential bevel gear 28 drives the spur gear 56 which is keyed to the driven shaft 44. Also keyed to this shaft is the bevel pinion 57 which drives the bevel gear 46 mounted on the truss member or fixed axle 35. Secured to the hub of the bevel gear 46, or preferably integral therewith, is a spur pinion 48 which rotates with the bevel gear about the axle member. This in turn drives the spur gear 7 suitably fixed to the driven axle section 6.

It may be noted that the axle sections 6, 6' may be disposed directly beneath the differential and driving shaft section 15, so that a vertical plane through the longitudinal axis of the axle sections would substantially coincide with the center of the differential mechanism, or the differential mechanism and intermediate shaft mechanism may be swung either forwardly or rearwardly of such vertical plane so that the relative distance between the driving shaft section and the axle sections may be reduced, or if substantially the same distance between them be maintained, the gear reduction ratio may be increased by the use of larger gear elements. As shown in the drawings, the differential mechanism and intermediate shaft mechanism are disposed rearwardly of the centers of the axle sections.

It may be noted that all closures for the housing are imperforate with the exception of the closure for the forward end of the driving shaft 15. In the latter case the closure nut engages packing to prevent leakage in the driving shaft section 15. The other closures which are imperforate may be tightened and packed, if desirable, to prevent leakage of lubricant from the housing.

My construction of power transmitting mechanism comprises but few correlated elements. At the same time it permits of differential movement between the axle sections and provides for the transmission of power to the wheels with reduction in speed thereof in three stages of gearing. With this construction the size of the gears and pinions and also of the bearings may be relatively reduced from that in a double reduction axle construction and yet practically any desired reduction ratio may be provided in applying the principles exemplified in the construction herein shown and described.

From the foregoing description it will be seen that my power transmitting mechanism is relatively simple, although providing for the driving of the wheels with speed reductions in three stages efficiently under all conditions of use, and that the elements thereof may be relatively small, to insure their cheap and easy manufacture, as well as ample strength and durability thereof. Furthermore, the reduced size of the parts, including the relatively small housing, permits a relatively large road clearance.

All of the elements of the mechanism, as well as the driven axle sections, may be readily disassembled and assembled.

It will also be seen that all of the driving pinions and gears are carried by driven shafts or axles supported on both sides of such gear and pinions by suitable bearings, that is, none of the gears and pinions are mounted on free ends of shafts or axles.

It will also be seen that the construction herein disclosed permits the first reduction from the relatively high speed differential mechanism to be transmitted thru spur gears located ahead of the bevel gear reduction, so that the spur gears are disposed in planes substantially at right angles to the propeller shaft and parallel to the axis of the driven axle sections, thus reducing gear starting stresses. Furthermore, the last gear reduction is accomplished by means of spur gears.

It will further be seen that by the provision of the braced axle receiving member 14, the truss and axle member 35, and the shaft members 44, 44', all of which are secured to opposite sides of the housing and closely adjacent the various gear members, I am enabled to secure great rigidity of construction and prevent twisting, flexing, or distortion of the various shafts and axles and the disalinement of the gears relative to their driving pinions.

It is also to be noted that with the construction herein disclosed and with the housing containing the usual amount of lubricant in the enlarged central chamber, only the relatively slow moving spur gears project downwardly sufficiently into the bottom portion of the chamber to dip into the lubricant. This is of advantage when the lubricant is of relatively high viscosity, as when starting, for the relatively small surface area of these gears and the relatively slow speed decreases the usual resistance or churning action occasioned by forcing relatively large surfaces of metal at relatively high speed thru the lubricant, as for example a revolving differential mechanism.

It is obvious that with the spur gears connected to the driven axle sections and with spur gears dipping in the lubricant that the latter will be splashed thru the housing sufficiently to lubricate all parts of the mechanism.

By having the speed reducing gears, driving shaft and differential mechanism arranged in different horizontal planes from the driven axle sections and within vertical planes thru the outside of the spur gears connected to the driven axle sections, the speed reducing mechanism is contained in a relatively small and compact housing and permits a relatively large road clearance.

The location of the differential mechanism is such that it is only subject to very light strains as all of the reduction takes place after the power has been transmitted through the differential. On a slippery surface this construction reduces the spinning effect of the wheels, which occurs on the conventional type axle where the differential is located on the axle shafts. A possible explanation of this may be that such resistance to the spinning of one of the wheels on a slippery surface arises from the friction or inertia naturally inherent in sets of reducing gears located between the differential mechanism and the wheels. In commercial constructions now in use where there are two or more reductions in speed it is usually customary to have at least one of the reductions ahead of the differential mechanism in the line of power transmission, and in this case there is noticeably more tendency to spin on a slippery surface perhaps because of the less reduction gearing between the differential and the wheels.

It will further be seen that with the construction herein disclosed the driving shaft is positioned a substantial distance above the plane of the axes of the driven axle sections, whereby said driving shaft section may be connected with the usual universal joint of the propeller shaft in a vehicle chassis, and yet the axis of such driving shaft section may be kept in substantially a horizontal plane and in alinement with the propeller shaft. This feature of construction enables my axle to be applied to shafts such as those designed for the worm drive and permits a substantially straight line drive.

Furthermore it is to be understood that the particular forms of apparatus shown and described, and the particular procedure set forth, are presented for the purposes of explanation and illustration and that various modifications of said apparatus and procedure can be made without departing from my invention as designed in the appended claims.

What I claim is:

1. The combination in a driving axle of a housing, a pair of driven axle sections arranged therein, a driving shaft section, differential mechanism operated by said shaft section, spur pinions operated by each side of said differential mechanism, rotatable shafts arranged in said housing, spur gears secured to said shafts and and bevel pinions secured to said shafts and driven by said spur pinions, fixed shafts arranged in said housing, bevel gears and spur pinions mounted to rotate on said fixed shafts and driven by said bevel pinions, and spur gears mounted on the inner ends of said axle sections to drive the same, said gears being actuated by said last named spur pinions.

2. The combination in a driving axle of a housing, a pair of driven axle sections arranged end to end therein, a driving shaft and counter shafts disposed in said housing at an angle to said driven axle sections, differential mechanism actuated by said driving shaft, a truss member in said housing arranged at an angle to said driving shaft and carrying bevel gears, spur gears secured to the inner ends of said axle sections, spur pinions mounted to rotate on said truss member and actuated by said bevel gears, bevel pinions and spur gears fixed to said counter shafts and operated by said spur pinions mounted on the driving shaft, each of said last named spur pinions being actuated by one side of the differential mechanism.

3. The combination in a driving axle of a housing, a pair of driven axle sections arranged end to end therein, a driving shaft and counter shafts disposed in said housing at an angle to said driven axle sections, differential mechanism actuated by said driving shaft, a truss member in said housing arranged at an angle to said driving shaft and receiving said counter shafts, spur gears connected to the inner ends of said axle sections, spur pinions mounted to rotate on said truss member, bevel gears on said member, said spur pinion being actuated by said bevel gears, bevel pinions and spur gears fixed to said counter shafts and operated by said spur pinions mounted on the driving shaft, each of said spur pinions being actuated by one side of the different mechanism.

4. The combination in a driving axle of a housing, a pair of driven axle sections arranged end to end therein, spur gears fixed thereto, a supporting member secured to the bottom and sides of the housing and having bearings to receive the inner ends of said axle sections, a driving shaft having its inner end disposed in said housing, differential mechanism having means to actuate reduction gearing between said differential mechanism and the spur gears on said axle sections, said reduction gearing being mounted on counter shafts and a truss member engaging opposite sides of said housing.

5. The combination with a driving axle of a housing, a driving shaft section mounted therein between bearings in opposite sides of said housing, differential mechanism mounted on said driving shaft and operated thereby, said differential mechanism including bevel gears having hub portions to rotate on said shaft, spur pinions actuated by hub portions, rotatable shafts mounted in bearings in the sides of said housing for rotation with said shaft, spur gears and bevel pinions fixed to said rotatable shafts, a fixed truss member arranged at an angle to said previously mentioned shafts, bevel gears carrying spur pinions mounted on axle sections of said truss member, said bevel gears being actuated by said bevel pinions, and spur gears mounted on axle sections for driving the same, said spur gears being driven by said last named spur pinions.

6. The combination with a driving axle, of a housing comprising a body portion, tubular members secured thereto, driven axle sections mounted in said tubular members and having their inner ends disposed in the body member of said housing and supported by a frame work connecting the front and rear of the housing on opposite sides of said axle sections, a fixed truss member connecting opposite sides at an angle to said frame work, a driving shaft disposed in said housing and actuating the differential mechanism, speed reducing gearing interposed between said differential mechanism and actuating said driving axle sections, parts of said gearing being mounted to rotate on said truss member.

7. The combination in a driving axle of a housing, a pair of driven axle sections arranged therein, a driving shaft disposed within said housing, driven shafts substantially parallel to said driving shaft carried by opposite walls of said housing, a truss member at an angle to said driven shafts mounted in opposite side walls of said housing, differential mechanism and reduction gearing mounted on said shafts and truss member to receive power from said driving shaft and transmit it to said axle sections.

8. The combination in a driving axle of a housing, a pair of driven axle sections arranged therein and having inner ends, said ends being mounted in a bearing support connecting opposite sides of said housing, a fixed shaft disposed at an angle to said support and secured to opposite sides of said housing, a driving shaft and driven shafts mounted in opposite sides of said housing and disposed at an angle to said fixed shaft, differential mechanism and reduction gearing disposed within said housing to receive power from said driving shaft and transmit it to said axle sections.

9. The combination in a driving axle of a housing, a pair of driven axle sections arranged therein and having their inner ends mounted in a bearing support connecting opposite sides of said housing, a fixed shaft disposed at an angle to said support and secured to opposite sides of said housing, a driving shaft and driven shafts mounted on opposite sides of said housing and disposed at an angle to said fixed shaft, said driven shafts being mounted in apertures in said fixed shaft, differential mechanism and reduction gearing disposed within said housing to receive power from said driving shaft and transmit it to said axle sections.

10. The combination in a driving axle of a housing having upper and lower parts, a pair of driven axle sections having their inner ends carried by a bearing support, an assembly comprising a fixed shaft having apertures and driven shafts mounted therein at an angle thereto, said fixed and driven shafts being of such length as to terminate in opposite walls of said housing, said assembly resting on the upper part of said lower housing section and carrying speed reducing gearing to engage gears secured to said axle sections, the upper part of said housing having a driving shaft and differential mechanism disposed therein and adapted to be secured to said lower housing section to engage reduction gearing whereby power may be transmitted from said driving shaft to said axles.

11. The combination in a driving axle of a housing comprising upper and lower sections, driven axle sections mounted in the lower part of said housing and carrying driving gears, juxtaposed openings between the upper and lower housing sections, an assembly of elements comprising fixed and driven shafts carrying speed reducing gears to actuate said driving gears, the ends of said shafts being mounted in said openings, and a driving shaft with a differential mechanism actuated thereby carried by said upper housing sections, said differential mechanism having means to actuate said speed reducing gears.

12. The combination in a driving axle of a housing comprising upper and lower sections detachably secured together, juxtaposed openings formed in said housing sections to receive the ends of fixed and driven shafts, a driving shaft and differential mechanism removably secured to said upper housing section, said fixed and driven shafts forming an assembly which is bodily removable into and out of position when said upper housing section is removed, driven axle sections mounted in said lower housing section and having driving gears connected thereto, said gears being driven by speed reduction gearing carried by said fixed and driven shafts and actuated by said differential mechanism.

13. The combination in a driving axle of a sectional housing, a pair of driven axle sections mounted in the lower part of said housing and having driving gears connected thereto, a speed reducing assembly comprising fixed and driven shafts secured together and carrying speed reducing gearing in trains, said assembly being adapted to be superposed above said axle sections to drive the gears connected thereto and a driving shaft carried by the upper part of said housing having a differential mechanism thereon, each side of which actuates one train of said reducing gearing to drive one of said axle sections.

14. The combination in a driving axle of a housing, a pair of driven axle sections arranged therein, a driving shaft and differential mechanism carried thereby, speed reduction gearing mounted on fixed and driven shafts intermediate said driving shaft and said axle sections and means actuated by each side of said differential mechanism to drive said speed reducing gearing and through it to drive such axle sections, said driving shaft and differential having their axes in one plane, said fixed and driven shafts having their axes in another plane and said driven axle sections having their axes in still another plane.

15. The combination in a driving axle of a housing, a pair of driven axle sections arranged therein and having oppositely disposed spur gears secured thereto, a fixed shaft mounted in said housing and having spur pinions and bevel gears mounted to rotate thereon, said pinions being above and meshing with said spur gears, driven shafts having their axes in the same plane as said fixed shaft and having bevel pinions and spur gears secured thereto, a driving shaft and differential mechanism actuated thereby, spur pinions operated by each side of said differential mechanism to mesh with said last named spur gears, said driving shaft having its axis in a plane above said fixed shaft.

16. The combination in a driving axle of a housing having a central chamber with lubricant therein, a pair of driven axle sections having their inner ends disposed in said chamber and having gears connected thereto, speed reducing gearing mounted on a fixed shaft and on driven shafts superposed above said axle sections, and having spur pinions to mesh with said spur gears, a driving shaft and differential mechanism disposed in said housing above said fixed shaft and having means to actuate said speed reducing gearing, whereby only said gears connected to said driven axle sections and which are relatively slow moving, project below said driven axle sections to engage lubricant in said chamber.

17. The combination in a driving axle of a housing, a pair of driven axle sections arranged therein and having their inner ends mounted in a bearing support, said support connecting opposite sides of said housing, a fixed shaft secured to opposite sides of said housing, a driving shaft and driven shafts mounted in opposite sides of said housing and disposed at an angle to said driven axle sections, said driven shafts being disposed in apertures in said fixed shaft, said fixed shaft being secured intermediate its ends to the upper part of said bearing support whereby said fixed shaft is preventing from rotating and frictionally engaging said driven shafts, differential mechanism operated by said driving shaft, and reduction gearing disposed within said housing and on said fixed and driven shafts to receive power from said differential mechanism and transmit it to said axle sections.

18. The combination in a driving axle of a housing, a pair of driven axle sections arranged end to end therein, a driving shaft and counter shafts disposed in said housing at an angle to said driven axle sections, differential mechanism mounted on said driving shaft and actuated thereby, a fixed shaft supported in said housing counter to said driving shaft, and carrying bevel gears and spur pinions loosely mounted on opposite ends thereof, spur gears and bevel pinions connected to said counter shafts and driven by spur pinions mounted on said driving shaft, said bevel pinions meshing with the bevel gears mounted on the fixed shaft, spur gears connected to the driven axle sections and meshing with the spur pinions mounted on said fixed shaft.

19. The combination with a pair of driven axle sections of a driving shaft section, differential mechanism operated by said driving shaft section, relatively small spur gears secured to the inner ends of said axle sections to drive the same, speed reducing gearing mounted on a truss member and driven axle sections arranged at an angle thereto in a plane above said driven axle sections and spur gears, a driving shaft and differential mechanism actuated thereby disposed above said truss member and driven shafts, said driving shaft and driven shafts and speed reducing gearing mounted thereon being disposed between vertical planes through said spur gears whereby a relatively small housing and a relatively large road clearance is obtained.

20. The combination in a driving axle of a housing, a pair of driven axle sections arranged end to end therein and having spur gears fixed thereto, counter shafts and a truss member engaging opposite sides of said housing and having speed reduction gearing mounted thereon, a driving shaft having its opposite ends disposed in said housing, a differential mechanism mounted on said driving shaft and having means to actuate said reduction gearing, said housing having closure members to entirely enclose said truss member and counter shafts and to enclose the rear end of said driving shaft, and means to prevent lubricant leaking along said driving shaft through the front wall of said housing, whereby a substantially lubricant-tight housing is obtained.

21. The combination with a pair of driven axle sections, of a driving shaft section, a differential mechanism mounted thereon, speed reducing gearing operated from each side of said differential mechanism and comprising spur gearing, bevel gearing and spur gearing to drive said axle sections.

22. The combination with a pair of driven axle sections of a driving shaft section, a differential mechanism mounted on said driving shaft section and operated thereby, a pair of spur gears each driven by one side of the differential mechanism, speed reducing bevel gearing mounted on a fixed shaft at an angle to said driving shaft and driven by pinions actuated by said spur gears, and an additional speed reducing mechanism between said bevel gears and the driven axle sections.

23. The combination with a pair of driven axle sections of a driving shaft section, a differential mechanism mounted thereon and speed reducing gearing interposed between said differential mechanism and the axle sections, said gearing comprising trains operated from each side of the differential and said trains comprising spur gearing, bevel gearing and spur gearing whereby a triple reduction in speed is obtained and whereby the inherent friction and inertia of such gearing resists relative rotation of one driven axle section with respect to the other.

24. The combination with a pair of driven axle sections of a driving shaft section, a differential mechanism operated thereby, a pair of gears each driven by one side of the differential mechanism, fixed supporting means at an angle to said driving shaft, speed reducing gearing mounted on said fixed means and driven by pinions actuated by said first mentioned gears, and additional speed reducing gearing between said gearing on the fixed means and the driven axle sections.

25. The combination in a driving axle of a housing, a pair of driven axle sections arranged therein, a driving shaft section being disposed in said housing above and at an angle to the axle sections, a differential mechanism mounted on and operated by said driving shaft section, said differential mechanism being above the driven axle sections, a fixed shaft carried by said housing at an angle to said driving shaft and located between said differential mechanism and said axle sections, speed reduction gearing providing three stages of gear reduction to drive said axle sections, said gearing including separately mounted gears on the fixed shaft, and speed reducing gearing between the gears on the fixed shaft and the driven axle and between the gears on the fixed shaft and the differential mechanism, said separately mounted gears on the fixed shaft being actuated from opposite sides of the differential mechanism.

In testimony whereof, I hereunto affix my signature.

RALPH H. GOODRICH.